(12) United States Patent
Adolph et al.

(10) Patent No.: US 6,758,540 B1
(45) Date of Patent: Jul. 6, 2004

(54) METHOD AND APPARATUS FOR PROVIDING OSD DATA FOR OSD DISPLAY IN A VIDEO SIGNAL HAVING AN ENCLOSED FORMAT

(75) Inventors: Dirk Adolph, Ronnenberg (DE); Marco Winter, Hannover (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/460,482

(22) Filed: Dec. 14, 1999

(30) Foreign Application Priority Data

Dec. 21, 1998 (EP) ............................................. 98250444

(51) Int. Cl.$^7$ .......................... H04N 7/12; H04N 11/02; H04N 11/04
(52) U.S. Cl. ................... 375/240.26; 348/569; 348/589
(58) Field of Search ................................ 348/569, 589; 345/564, 720, 734; 375/240.26

(56) References Cited

U.S. PATENT DOCUMENTS

| | | | | | |
|---|---|---|---|---|---|
| 5,754,258 | A | * | 5/1998 | Hanaya | 348/734 |
| 6,081,300 | A | * | 6/2000 | Beyers | 348/589 |
| 6,163,345 | A | * | 12/2000 | Noguchi | 345/564 |
| 6,191,781 | B1 | * | 2/2001 | Chaney | 345/327 |
| 6,226,047 | B1 | * | 5/2001 | Ryu | 348/569 |
| 6,351,292 | B1 | * | 2/2002 | Knox | 348/569 |
| 6,411,308 | B1 | * | 6/2002 | Blonstein | 345/720 |
| 6,417,888 | B1 | * | 7/2002 | Dunn | 348/569 |

FOREIGN PATENT DOCUMENTS

| | | | |
|---|---|---|---|
| EP | 0810783 A1 | 12/1997 | H04N/5/44 |
| EP | 0840512 A2 | 8/1998 | H04N/7/24 |
| WO | 95/33342 | 12/1995 | |
| WO | 96/19077 | 6/1996 | H04N/7/025 |
| WO | 96/38007 | 11/1996 | H04N/7/52 |

OTHER PUBLICATIONS

Zon–Yin Shae, et al: "Mixing and Playback of JPEG Compressed Packet Videos" Communication for Global Users, Including a Communications Theory Mini Conference Orlando, Dec. 6–9, 1992, vol. 1, pp. 245–249, IEEE.
Copy of European Search Report Jun. 16, 1999.

* cited by examiner

Primary Examiner—Chris Kelley
Assistant Examiner—Charles Parsons
(74) Attorney, Agent, or Firm—Joseph S. Tripoli; Robert D. Shedd

(57) ABSTRACT

TVs and other consumer electronics devices like VCRs and DVD players use on-screen display of messages. For display together with MPEG encoded video signals the picture content of an OSD text or graphic is stored in a non-volatile memory in a specific format: the OSD text or graphic content is divided into macroblock units and the OSD macroblock data are stored in MPEG encoded form in the memory. The OSD macroblocks to be displayed are then handled as a slice.

10 Claims, 3 Drawing Sheets

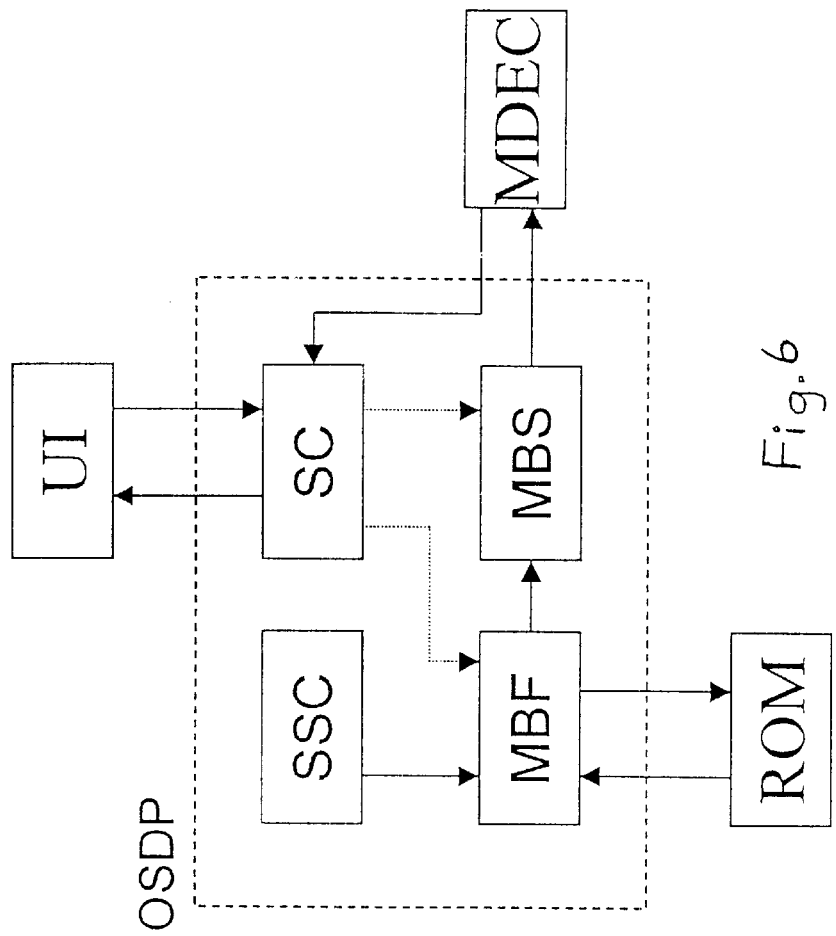
Fig. 6
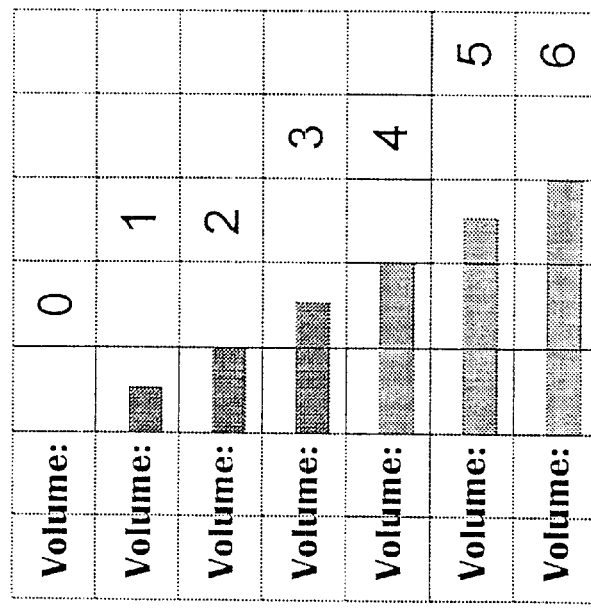
Fig. 7
Fig. 8

METHOD AND APPARATUS FOR PROVIDING OSD DATA FOR OSD DISPLAY IN A VIDEO SIGNAL HAVING AN ENCLOSED FORMAT

FIELD OF THE INVENTION

The invention relates to a method and to an apparatus for providing OSD data for OSD display in a video signal having an encoded format.

BACKGROUND OF THE INVENTION

TVs and other consumer electronics (CE) devices like VCRs and DVD players use on-screen display (OSD) of messages intended for making the control of the TV's operation parameters more convenient for the user. Also, a subtitling feature is desirable.

For such purposes an additional hardware is required for visualising e.g. user commands. This hardware includes a video memory and a video mixer. The video memory stores the OSD text or graphic to be displayed. For display, the video mixer combines the stored OSD text or graphic with the pictures of the program currently broadcast or replayed.

SUMMARY OF THE INVENTION

Some CE devices like Set-Top Boxes or DVD players already include an MPEG decoder according to the ISO/IEC standards 11172 and 13818. Such MPEG decoders are available as chips, e.g. the MPEG2 decoder IC STi3520A of SGS-Thomson. In connection with such devices it is possible to omit for OSD purposes the above mentioned video mixer and thereby to reduce pretty expensive hardware. As explained below it is also possible to thereby reduce the required memory capacity which again makes the CE device cheaper.

As depicted in FIG. 1 an MPEG video signal consists of a sequence of pictures of intraframe type I1, I2, . . . , predicted type P1, P2, . . . , and bi-directionally predicted type B1, B2, B3, B4, B5, . . . .

FIG. 2 shows that each picture is formed from macroblocks MB which have a size of 16 lines LI with 16 pixels PI each. The picture may consist of 36 rows and 45 columns of such macroblocks. For some countries a picture has 30 rows of macroblocks. The decoding order DCO of the macroblocks begins in the top left corner of the pictures.

According to the invention the picture content of an OSD text or graphic is stored in a non-volatile memory, e.g. a ROM, in a specific format: the OSD text or graphic content is divided into macroblock units and the OSD macroblock data are stored in MPEG encoded form in said non-volatile memory. Such macroblocks are of I-type.

Thereby the feature is used that an MPEG picture is partitioned into slices as depicted in FIG. 3, example slices A to Q. A slice is a series of an arbitrary number of consecutive macroblocks. The first and last macroblocks of a slice are not skipped macroblocks. Every slice contains at least one macroblock. Slices do not overlap. The position of slices may change from picture to picture. The first and last macroblock of a slice are in the same horizontal row of macroblocks. Slices occur in the bitstream in the order in which they are encountered, starting at the upper-left of the picture and proceeding by raster-scan order from left to right and top to bottom. In the slice header, information is stored on the position in the picture the current slice is located. Normally, each macroblock in a picture is enclosed in a slice.

It is not necessary that the slices cover the entire picture, as shown in FIG. 4, example slices A to I. Those areas in a specific picture that are not enclosed in a slice are not encoded.

According to the invention an OSD can have the shape of a slice, e.g. like slices F, H and/or I in FIG. 4. In order to display OSDs in an MPEG-decoded picture one can decode (with or without the data of the macroblocks to be overlaid by the OSD) a video frame first and store it in the frame memory. Thereafter a video frame consisting (only) of the OSD macroblocks is decoded using an MPEG decoder, and is written at corresponding address values into that frame memory which holds the previously MPEG decoded video frame. Then the combined frame memory content is read and displayed as a complete video picture.

The invention has the advantage, that no complex hardware like a video mixing device is necessary for processing OSD data. On one side the memory space necessary for OSD purposes is distinctly reduced due to the fact that the OSD macroblock data are stored in compressed form. On the other side it is also possible to use high-quality graphic for OSDs due to the compressed-format storage. Normally, OSDs have a low colour resolution only so that the required memory capacity is further reduced.

It is one object of the invention to disclose a method for providing OSD data for OSD display in a video signal having an encoded format. It is a further object of the invention to disclose an apparatus which utilises the inventive method.

In principle, the inventive method is suited for providing OSD data for OSD display in a video signal having an encoded format, wherein the picture content of an OSD text or graphic or picture to be displayed is stored in that encoded format in a memory and is for the purpose of display correspondingly decoded and replaces at the OSD display area the matching area of the correspondingly decoded video signal, and wherein the encoded format is a format using data reduction.

Advantageously said data reduction format is the MPEG format and the encoded format of said OSD text or graphic or picture to be displayed are MPEG macroblocks of I-type, wherein the OSD macroblocks to be displayed form at least one MPEG slice.

In principle the inventive apparatus provides OSD data for OSD display in a video signal having an encoded format wherein the encoded format is a format using data reduction, and includes:

- a memory in which the picture content of an OSD text or graphic or picture to be displayed is stored in that encoded format;
- means for assembling OSD data to be decoded from said memory according to a request from an interface;
- decoding means for decoding said video signal and for decoding said assembled OSD data for the purpose of display;
- picture memory means in which pictures of said decoded video signal are stored for subsequent display and in which at the OSD display area said decoded OSD data replace said decoded video signal.

BRIEF DESCRIPTION OF THE DRAWINGS

Embodiments of the invention are described with reference to the accompanying drawings, which show in:

FIG. 6 OSD processor in more detail;

FIG. 7 example of a set of pre-encoded macroblock data for a volume bar which are stored in the ROM;

FIG. 8 examples of volume bars displayable with a set according to FIG. 7.

DETAILED DESCRIPTION OF PREFERRED EMBODIMENTS

Figure 1:
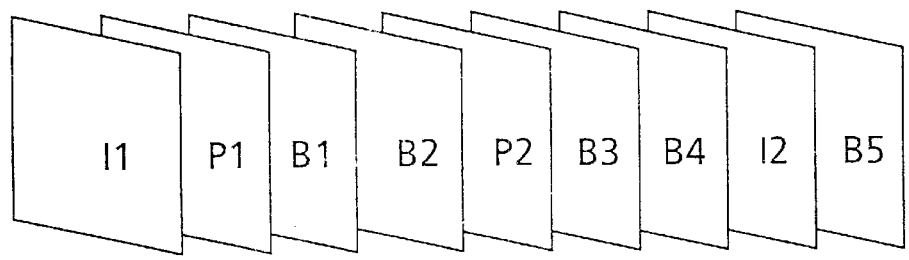
FIG. 1 sequence of pictures of different type.
Figure 2:
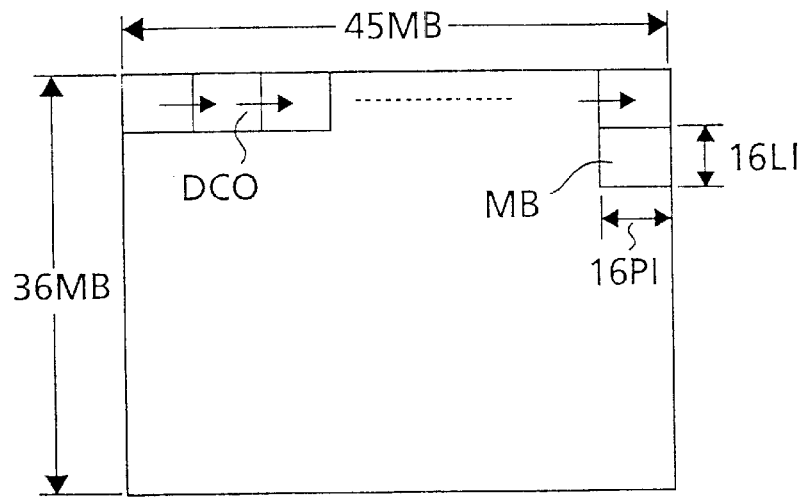
FIG. 2 arrangement of macroblocks in a picture.
Figure 3:
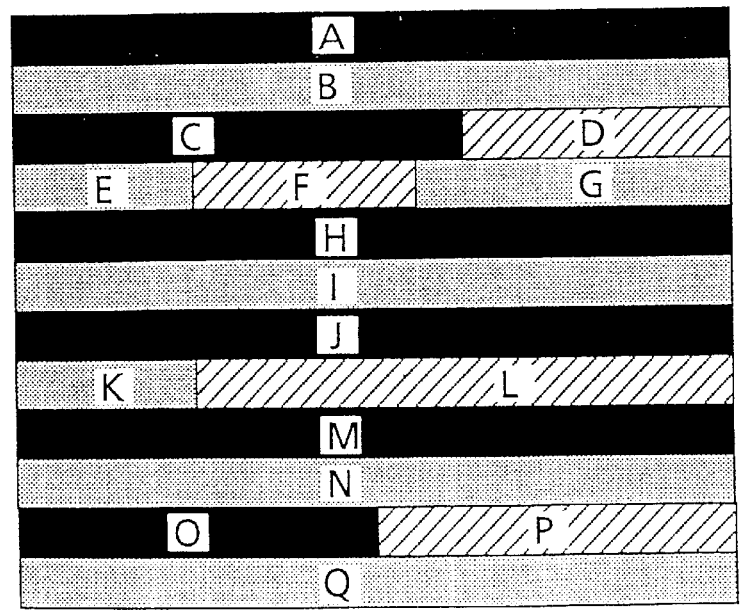
FIG. 3 picture with a first partition into slices.
Figure 4:
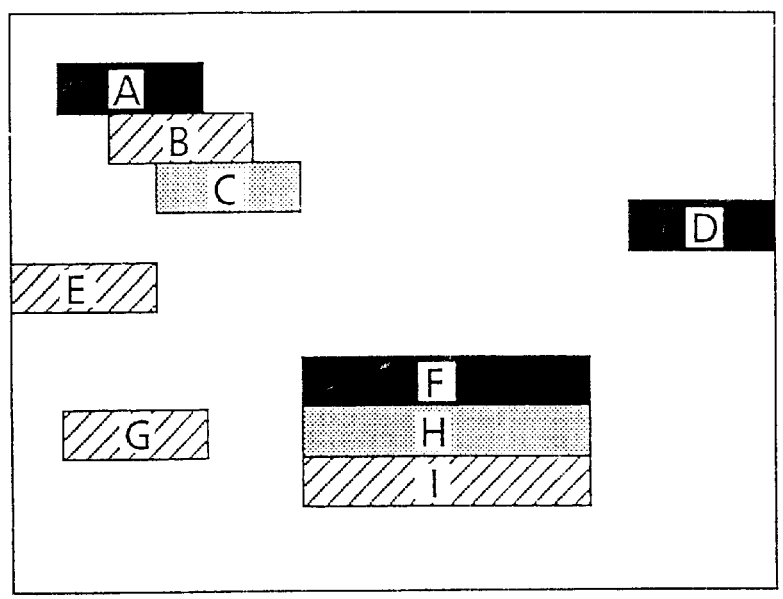
FIG. 4 picture with a second partition into slices, suited for OSD purposes.
Figure 5:
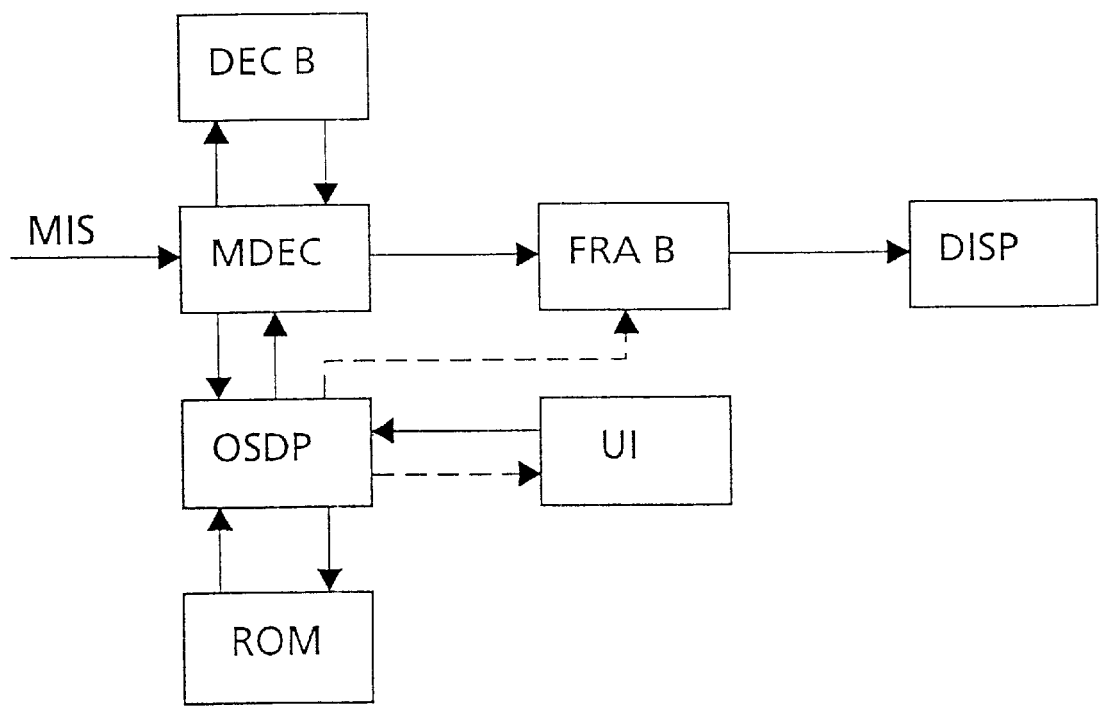
FIG. 5 a decoder with OSD feature.

In FIG. 5 an MPEG video input signal MIS is fed to an MPEG video decoder MDEC. MDEC interacts with a decoder buffer DECB which serves e.g. for collecting the required input data stream data packets and for presenting the decoded data at the correct presentation time. The output signal of MDEC is intermediately stored in a picture memory, i.e. a frame or field buffer FRAB, before being fed to a display DISP. A memory ROM stores OSD data in a compressed format which corresponds to the MPEG macroblock format. Controlled by a user interface UI the OSD data to be displayed become selected. UI may be a remote control or a PC. An OSD processor OSDP interacts with UI, with MDEC and with ROM. According to the OSD content desired by UI, OSDP selects the corresponding macroblock data from ROM, arranges it as a slice or as slices and loads these slice data into MDEC. The desired position of the OSD data within the pictures is taken from the header information of the OSD slices.

As shown in FIG. 6, OSDP may include a state control SC, a slice start code generator SSC, a macroblock fetcher MBF and a macroblock splicer MBS working together to create OSD macroblock slices requested by user interface UI. All blocks within the OSDP are under control of the SC which itself interacts with UI and gets status information including slice information from MDEC. When beginning the generation of an OSD macroblock slice, the MBF takes the slice start code from SSC and sends it to MBS. After the slice start code, the MBF fetches according to the OSD status different macroblocks from the OSD ROM. These macroblocks are arranged by MBS to generate the final output order, e.g. one of the seven volume bar examples of the spliced macro patterns depicted in FIG. 8 when using an example set of pre-encoded volume bar macroblock data shown in FIG. 7 which are stored in ROM. The OSD slice output data are fed to MDEC. Advantageously, the encoded OSD data with horizontally adjacent OSD macroblocks form together a slice with only one slice start code. As a futher advantage, the encoded OSD macroblock data can use less bit-consuming DC coefficients based on differential DC coefficients.

The OSD slice is finished in accordance with a new slice start code related to the following macro blocks of the original picture content.

When the OSD slice content remains unchanged and active in the following pictures, it is possible to skip the OSD slice macroblocks for the following pictures because they are already available in the previously decoded picture frame. The related motion vectors are zero and the OSD macro-block picture content is replaced by the OSD macroblock data already decoded with the corresponding initial frame.

It is also possible to write the OSD data coming from OSDP directly into the decoder buffer DECB at address values required by the decoding order with respect to the location of the OSD slices in the picture and thereby to prevent decoding of the original picture data located at the position of the OSD slices.

However, such OSD data insertion is not possible in case of moving picture content in the MIS input signal in the vicinity of the location of the OSD slices.

In case of special OSD content like e.g. a simple bar the length of which correlates with the current loudness setting, which can be generated easily as a picture content, it may be advantageous to not store it in MPEG decoded format in ROM but to generate it separately in OSDP and to write it directly into FRAB.

A further advantage of the invention is that the decoded picture quality of the OSD display can be varied within a wide range according to the desired application. E.g. simple messages or symbols can be decoded with limited quality (using e.g. coarse inverse quantisation) resulting in a faster display, whereas OSD pictures can be decoded with high quality (using e.g. fine inverse quantisation).

For special applications it is also possible to generate the encoded OSD data on-the-fly using an MPEG encoder, or to load the OSD data from elsewhere, e.g. a separate data carrier or from the Internet, whereby the OSD data memory ROM can be a RAM.

The invention can be used in connection with ISO/IEC standards 11172 (MPEG1), 13818 (MPEG2), and 14496 (MPEG4), and with other video signal coding standards.

It is also possible to store together with, or instead of, the coded video subtitle a corresponding audio "subtitle" or jingle in coded form. This audio code becomes decoded and is either mixed with the normal audio sound or replaces the normal audio sound for a short period of time when the subtitle is displayed or the jingle is presented. The audio code can be e.g. MPEG1 Layer 1 to 3, MPEG2, MPEG2-AAC, MPEG4, AC-3, PAC/MPAC/EPAC, DTS.

What is claimed is:

1. Method for providing OSD data for OSD display, wherein the picture content of different OSD characters or texts or graphics or pictures to be displayed is stored in an MPEG I-type macroblock encoded format each in an OSD data memory, and is for the purpose of display correspondingly assembled and decoded, including the steps:

intermediately storing an MPEG decoded picture to be displayed together with selected ones of said different OSD characters or texts or graphics or pictures inserted in a picture memory;

forming a slice from multiple horizontally adjacent ones of said assembled encoded OSD macroblocks, which slice includes a single slice start code only and which slice is decoded and intermediately stored in said picture memory at corresponding address values, reading the thus combined picture memory content as a complete picture to be displayed.

2. Method according to claim 1, wherein the encoded OSD macroblock data use less bit-consuming DC coefficients.

3. Method according to claim 1, wherein the OSD macroblocks to be decoded in a following picture or pictures with the OSD content still active are skipped and the related motion vectors are zero and the OSD macro-block picture content is replaced by the OSD macroblock data already decoded with the corresponding initial frame.

4. Method according to claim 1, wherein said memory is a non-volatile memory, e.g. a ROM.

5. Method according to claim 1, wherein the OSD macroblock to be decoded become assembled according to the request from an user interface.

6. Method according to claim 1, wherein in case of special OSD content like e.g. a simple bar the required OSD data is not stored in said picture memory but is generated separately and is written directly into said picture memory.

7. Method according to claim 1, wherein in addition encoded audio data are stored in said memory and are selected and decoded in connection with said OSD data.

8. Apparatus for providing OSD data for OSD display, wherein the picture content of different OSD characters or texts or graphics or pictures to be displayed is stored in an MPEG I-type macroblock encoded format each in an OSD data memory, and is for the purpose of display correspondingly assembled and decoded, and including:

means for assembling selected ones of multiple horizontally adjacent ones of OSD macroblocks from said OSD data memory, and for forming therefrom a slice that includes a single slice start code only;

decoding means for decoding an MPEG decoded picture to be displayed together with said selected ones of said different OSD characters or texts or graphics or pictures inserted, and for decoding said slice of OSD macroblocks;

a picture memory into which said MPEG decoded pictures is intermediately stored and into which said decoded slice of OSD macroblocks is intermediately stored at corresponding address values, wherein the thus combined picture memory content is read as a complete picture to be displayed.

9. Apparatus according to claim 8, wherein said memory is a non-volatile memory, e.g. a ROM.

10. Method according to claim 1, wherein the OSD data for said OSD data memory is loaded from a separate data carrier or from the Internet.

\* \* \* \* \*

UNITED STATES PATENT AND TRADEMARK OFFICE
CERTIFICATE OF CORRECTION

PATENT NO. : 6,758,540 B1
DATED : July 6, 2004
INVENTOR(S) : Adolph Dirk and Winter Marco It is certified that error appears in the above-identified patent and that said Letters Patent is hereby corrected as shown below:

Title page,
Item [56], References Cited, U.S. PATENT DOCUMENTS, insert -- 5,828,791 --

Signed and Sealed this

First Day of February, 2005

JON W. DUDAS
*Director of the United States Patent and Trademark Office*